(12) United States Patent
Koetting et al.

(10) Patent No.: US 8,426,050 B2
(45) Date of Patent: Apr. 23, 2013

(54) BATTERY MODULE HAVING COOLING MANIFOLD AND METHOD FOR COOLING BATTERY MODULE

(75) Inventors: William Koetting, Davisburg, MI (US); Josh Payne, Royal Oak, MI (US)

(73) Assignee: LG Chem, Ltd., Seoul (KR)

( * ) Notice: Subject to any disclaimer, the term of this patent is extended or adjusted under 35 U.S.C. 154(b) by 588 days.

(21) Appl. No.: 12/164,627

(22) Filed: Jun. 30, 2008

(65) Prior Publication Data

US 2009/0325052 A1 Dec. 31, 2009

(51) Int. Cl.
*H01M 2/02* (2006.01)
*H01M 10/02* (2006.01)
*H01M 10/04* (2006.01)

(52) U.S. Cl.
USPC ............ 429/120; 429/149; 429/156; 429/158

(58) Field of Classification Search .................. None
See application file for complete search history.

(56) References Cited

U.S. PATENT DOCUMENTS

| | | |
|---|---|---|
| 2,273,244 A | 2/1942 | Ambruster |
| 3,503,558 A * | 3/1970 | Galiulo et al. ................ 239/499 |
| 3,522,100 A | 7/1970 | Lindstrom |
| 4,390,841 A | 6/1983 | Martin et al. |
| 4,396,689 A | 8/1983 | Grimes et al. |
| 5,071,652 A | 12/1991 | Jones et al. |
| 5,270,131 A | 12/1993 | Diethelm et al. |
| 5,346,786 A | 9/1994 | Hodgetts |
| 5,354,630 A | 10/1994 | Earl et al. |
| 5,364,711 A | 11/1994 | Yamada et al. |

(Continued)

FOREIGN PATENT DOCUMENTS

| | | |
|---|---|---|
| CN | 1512518 A | 7/2004 |
| EP | 0736226 B1 | 3/1999 |

(Continued)

OTHER PUBLICATIONS

U.S. Appl. No. 12/165,100, filed Jun. 30, 2008 entitled Battery Cell Assembly Having Heat Exchanger with Serpentine Flow Path.

(Continued)

*Primary Examiner* — Ula C. Ruddock
*Assistant Examiner* — Alix Echelmeyer
(74) *Attorney, Agent, or Firm* — Buckert Patent & Trademark Law Firm, P.C.

(57) ABSTRACT

A battery module having a cooling manifold is provided. The battery module includes a plurality of battery cell assemblies having a plurality of heat exchangers. The battery module further includes the cooling manifold operably coupled to the plurality of battery cell assemblies. The cooling manifold has a manifold portion and a cover plate. The manifold portion has a peripheral wall, a rear wall coupled to the peripheral wall, and a flow diverter. The peripheral wall has a top portion with an inlet aperture extending therethrough. The rear wall has a plurality of outlet apertures extending therethrough. The cover plate is coupled to the peripheral wall opposite to the rear wall. The flow diverter extends from the rear wall and is disposed below the inlet aperture. The flow diverter is configured to receive fluid from the inlet aperture and to divert the fluid so that a substantially equal flow rate of the fluid is obtained through each outlet aperture of the plurality of outlet apertures to a respective heat exchanger of the plurality of heat exchanger for cooling the plurality of battery cell assemblies.

13 Claims, 4 Drawing Sheets

U.S. PATENT DOCUMENTS

| | | | |
|---|---|---|---|
| 5,385,793 A | 1/1995 | Tiedemann et al. | |
| 5,487,955 A | 1/1996 | Korall et al. | |
| 5,487,958 A | 1/1996 | Tura | |
| 5,510,203 A | 4/1996 | Hamada et al. | |
| 5,520,976 A | 5/1996 | Giannetti et al. | |
| 5,561,005 A | 10/1996 | Omaru et al. | |
| 5,589,290 A | 12/1996 | Klink et al. | |
| 5,606,242 A | 2/1997 | Hull et al. | |
| 5,652,502 A | 7/1997 | van Phuc et al. | |
| 5,658,682 A | 8/1997 | Usuda et al. | |
| 5,663,007 A | 9/1997 | Ikoma et al. | |
| 5,693,432 A | 12/1997 | Matsumoto | |
| 5,756,227 A * | 5/1998 | Suzuki et al. | 429/62 |
| 5,796,239 A | 8/1998 | can Phuoc et al. | |
| 5,825,155 A | 10/1998 | Ito et al. | |
| 5,982,403 A | 11/1999 | Inagaki | |
| 6,016,047 A | 1/2000 | Notten et al. | |
| 6,099,986 A | 8/2000 | Gauthier et al. | |
| 6,117,584 A | 9/2000 | Hoffman et al. | |
| 6,121,752 A | 9/2000 | Kitihara et al. | |
| 6,257,328 B1 | 7/2001 | Fujiwara et al. | |
| 6,353,815 B1 | 3/2002 | Vilim et al. | |
| 6,362,598 B2 | 3/2002 | Laig-Horstebrock et al. | |
| 6,406,812 B1 | 6/2002 | Dreulle et al. | |
| 6,413,678 B1 | 7/2002 | Hamamoto et al. | |
| 6,422,027 B1 | 7/2002 | Coates, Jr. et al. | |
| 6,441,586 B1 | 8/2002 | Tate, Jr. et al. | |
| 6,448,741 B1 | 9/2002 | Inui et al. | |
| 6,462,949 B1 | 10/2002 | Parish, IV et al. | |
| 6,475,659 B1 | 11/2002 | Heimer | |
| 6,515,454 B2 | 2/2003 | Schoch | |
| 6,534,954 B1 | 3/2003 | Plett | |
| 6,563,318 B2 | 5/2003 | Kawakami et al. | |
| 6,709,783 B2 | 3/2004 | Ogata et al. | |
| 6,724,172 B2 | 4/2004 | Koo | |
| 6,771,502 B2 | 8/2004 | Getz, Jr. et al. | |
| 6,780,538 B2 | 8/2004 | Hamada et al. | |
| 6,821,671 B2 | 11/2004 | Hinton et al. | |
| 6,829,562 B2 | 12/2004 | Sarfert | |
| 6,832,171 B2 | 12/2004 | Barsoukov et al. | |
| 6,876,175 B2 | 4/2005 | Schoch | |
| 6,886,249 B2 | 5/2005 | Smalc | |
| 6,892,148 B2 | 5/2005 | Barsoukov et al. | |
| 6,927,554 B2 | 8/2005 | Tate, Jr. et al. | |
| 6,943,528 B2 | 9/2005 | Schoch | |
| 6,967,466 B2 | 11/2005 | Koch | |
| 6,982,131 B1 | 1/2006 | Hamada et al. | |
| 7,012,434 B2 | 3/2006 | Koch | |
| 7,026,073 B2 | 4/2006 | Ueda et al. | |
| 7,039,534 B1 | 5/2006 | Ryno et al. | |
| 7,061,246 B2 | 6/2006 | Dougherty et al. | |
| 7,072,871 B1 | 7/2006 | Tinnemeyer | |
| 7,098,665 B2 | 8/2006 | Laig-Hoerstebrock | |
| 7,109,685 B2 | 9/2006 | Tate, Jr. et al. | |
| 7,126,312 B2 | 10/2006 | Moore | |
| 7,147,045 B2 | 12/2006 | Quisenberry et al. | |
| 7,197,487 B2 | 3/2007 | Hansen et al. | |
| 7,199,557 B2 | 4/2007 | Anbuky et al. | |
| 7,229,327 B2 | 6/2007 | Zhao et al. | |
| 7,250,741 B2 | 7/2007 | Koo et al. | |
| 7,251,889 B2 | 8/2007 | Kroliczek et al. | |
| 7,253,587 B2 | 8/2007 | Meissner | |
| 7,264,902 B2 | 9/2007 | Horie et al. | |
| 7,315,789 B2 | 1/2008 | Plett | |
| 7,321,220 B2 | 1/2008 | Plett | |
| 7,327,147 B2 | 2/2008 | Koch | |
| 7,400,115 B2 | 7/2008 | Plett | |
| 7,446,504 B2 | 11/2008 | Plett | |
| 7,479,758 B2 | 1/2009 | Moon | |
| 7,518,339 B2 | 4/2009 | Schoch | |
| 7,521,895 B2 | 4/2009 | Plett | |
| 7,525,285 B2 | 4/2009 | Plett | |
| 7,583,059 B2 | 9/2009 | Cho | |
| 7,589,532 B2 | 9/2009 | Plett | |
| 2001/0046624 A1 | 11/2001 | Goto et al. | |
| 2003/0082440 A1 | 5/2003 | Mrotek et al. | |
| 2003/0184307 A1 | 10/2003 | Kozlowski et al. | |
| 2004/0021442 A1 | 2/2004 | Higashino | |
| 2005/0026014 A1 | 2/2005 | Fogaing et al. | |
| 2005/0100786 A1 | 5/2005 | Ryu et al. | |
| 2005/0127874 A1 | 6/2005 | Lim et al. | |
| 2005/0134038 A1 | 6/2005 | Walsh | |
| 2005/0194936 A1 | 9/2005 | Cho | |
| 2006/0097698 A1 | 5/2006 | Plett | |
| 2006/0100833 A1 | 5/2006 | Plett | |
| 2006/0111854 A1 | 5/2006 | Plett | |
| 2006/0111870 A1 | 5/2006 | Plett | |
| 2007/0035307 A1 | 2/2007 | Scoch | |
| 2007/0037051 A1 | 2/2007 | Kim et al. | |
| 2007/0046292 A1 | 3/2007 | Plett | |
| 2007/0087266 A1 | 4/2007 | Bourke et al. | |
| 2007/0103120 A1 | 5/2007 | Plett | |
| 2007/0120533 A1 | 5/2007 | Plett | |
| 2007/0126396 A1 | 6/2007 | Yang | |
| 2007/0188143 A1 | 8/2007 | Plett | |
| 2007/0236182 A1 | 10/2007 | Plett | |
| 2008/0094035 A1 | 4/2008 | Plett | |
| 2008/0248338 A1 * | 10/2008 | Yano et al. | 429/13 |
| 2009/0155680 A1 * | 6/2009 | Maguire et al. | 429/158 |
| 2009/0186265 A1 | 7/2009 | Koetting et al. | |
| 2009/0325051 A1 | 12/2009 | Niedzwiecki et al. | |
| 2009/0325052 A1 | 12/2009 | Koetting et al. | |
| 2009/0325055 A1 | 12/2009 | Koetting et al. | |
| 2010/0086842 A1 | 4/2010 | Yang | |
| 2010/0266883 A1 | 10/2010 | Koetting et al. | |
| 2010/0275619 A1 | 11/2010 | Koetting et al. | |
| 2010/0276132 A1 | 11/2010 | Payne | |
| 2010/0279152 A1 | 11/2010 | Payne | |
| 2010/0279153 A1 | 11/2010 | Payne | |
| 2010/0279154 A1 | 11/2010 | Koetting et al. | |

FOREIGN PATENT DOCUMENTS

| | | | |
|---|---|---|---|
| EP | 0673553 B1 | 2/2001 | |
| EP | 1435675 A1 | 7/2004 | |
| JP | 4056079 A | 2/1992 | |
| JP | 8138735 A | 5/1996 | |
| JP | 8222280 A | 8/1996 | |
| JP | 9129213 A | 5/1997 | |
| JP | 09-219213 | 8/1997 | |
| JP | 10199510 A | 7/1998 | |
| JP | 11066949 A | 3/1999 | |
| JP | 11191432 A | 7/1999 | |
| JP | 2003219572 A | 7/2003 | |
| JP | 2005-126315 | 5/2005 | |
| JP | 2008-080995 | 4/2008 | |
| KR | 100530260 B1 | 11/2005 | |
| KR | 100889241 B1 | 4/2008 | |
| KR | 20080047641 A | 5/2008 | |
| KR | 100921346 B1 | 10/2009 | |
| WO | WO03/071616 A2 | 8/2003 | |
| WO | WO 2006/038519 | * 4/2006 | |

OTHER PUBLICATIONS

U.S. Appl. No. 12/164,780, filed Jun. 30, 2008 entitled Battery Module Having Battery Cell Assembly with Heat Exchanger.

U.S. Appl. No. 12/164,741, filed Jun. 30, 2008 entitled Battery Module Having Battery Cell Assemblies with Alignment-Coupling Features.

U.S. Appl. No. 11/828,927, filed Jul. 26, 2007 entitled Battery Cell Carrier Assembly Having a Battery Cell Carrier for Holding a Battery Cell Therein.

U.S. Appl. No. 12/164,445, filed Jun. 30, 2008 entitled Battery Module Having a Rubber Cooling Manifold.

U.S. Appl. No. 12/016,630, filed Jan. 18, 2008 entitled Battery Cell Assembly and Method for Assembling the Battery Cell Assembly.

Chinese Office Action dated Dec. 7, 2007 for Chinese Patent Application No. 200480025941.5 (PCT/KR2004/002399).

European Supplementary Search Report dated Aug. 28, 2009 for EP Application No. 04774658.

International Search Report for PCT/KR2009/000258 dated Aug. 28, 2009.

International Search report for International application No. PCT/KR2009/003428 dated Jan. 22, 2010.

International Search Report for International application No. PCT/KR2005/003755 dated Mar. 2, 2006.

International Search report for PCT/KR2009/003434 dated Jan. 18, 2010.
Machine translation of JP 08-138735.
Machine translation of JP 10-199510.
Machine translation of JP 2000 260469.
U.S. Appl. No. 12/511,530, filed Jul. 29, 2009 entitled Battery Module and Method for Cooling the Battery Module.
U.S. Appl. No. 12/511,552, filed Jul. 29, 2009 entitled Battery Module and Method for Cooling the Battery Module.
U.S. Appl. No. 12/549,766, filed Aug. 28, 2009 entitled Battery Module and Method for Cooling the Battery Module.
U.S. Appl. No. 12/794,949, filed Jun. 7, 2010 entitled Battery Module and Methods for Bonding a Cell Terminal of a Battery to an Interconnect Member.
U.S. Appl. No. 12/857,908, filed Aug. 17, 2010 entitled Battery Cell Assemblies.
U.S. Appl. No. 12/861,364, filed Aug. 23, 2010 entitled Connecting Assembly.
U.S. Appl. No. 12/861,375, filed Aug. 23, 2010 entitled attery System and Manifold Assembly Having a Manifold Member and a Connecting Fitting.
U.S. Appl. No. 12/861,381, filed Aug. 23, 2010 entitled End Cap.
U.S. Appl. No. 12/861,394, filed Aug. 23, 2010 entitled Battery System and Manifold Assembly With Two Manifold Members Removably Coupled Together.
U.S. Appl. No. 12/868,111, filed Aug. 25, 2010 entitled Battery Module and Methods for Bonding Cell Terminals of Battery Cells Together.

* cited by examiner

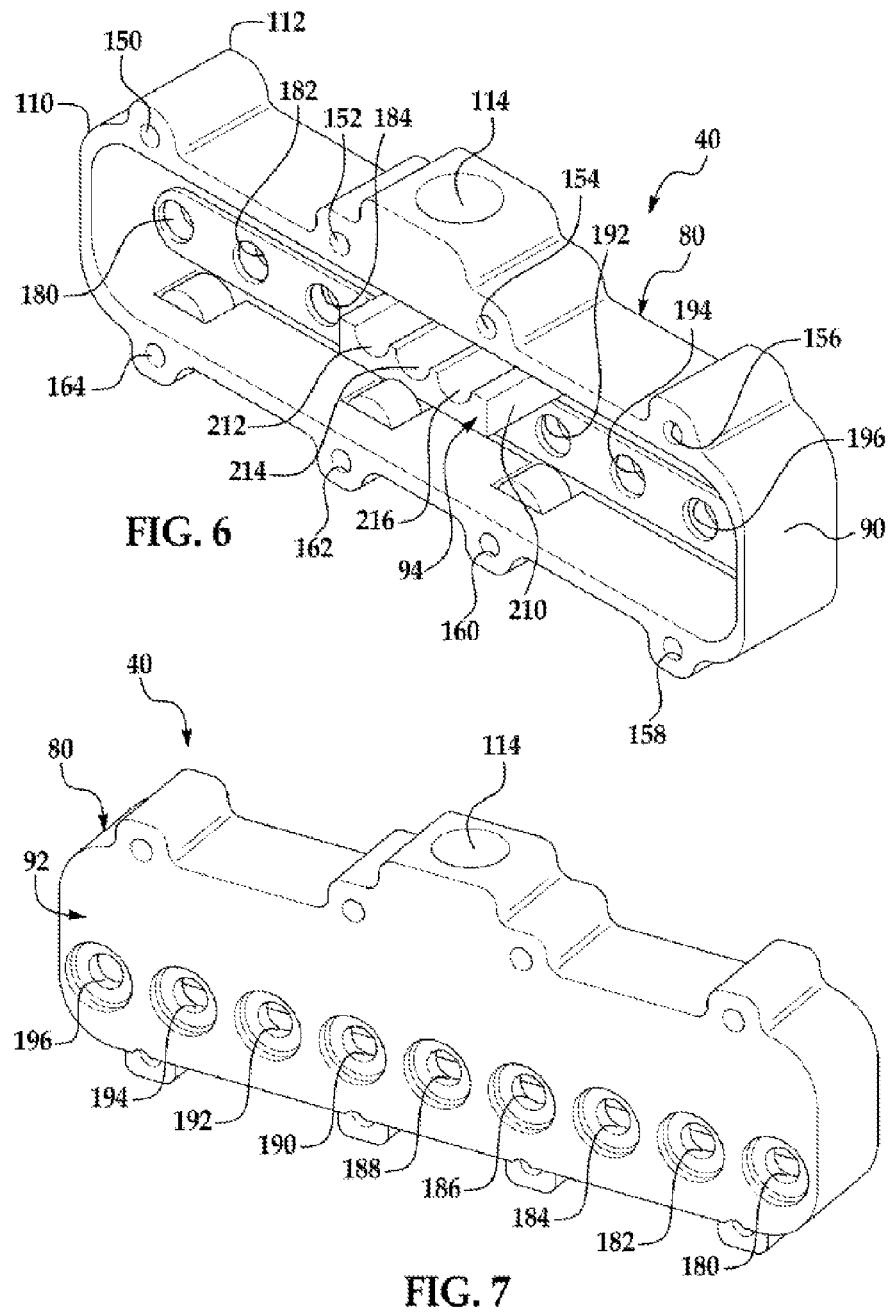

BATTERY MODULE HAVING COOLING MANIFOLD AND METHOD FOR COOLING BATTERY MODULE

TECHNICAL FIELD

This application relates generally to a battery module having a cooling manifold and a method for cooling the battery module.

BACKGROUND OF THE INVENTION

Battery packs generate heat during usage. To prevent degradation of the battery packs, the battery packs should be cooled. However, an existing cooling system may not uniformly cool battery cells in a battery pack. The inventors herein have recognized that if battery cells in a battery pack are not uniformly cooled, the battery cells can undesirably have differing operational characteristics including differing output voltages.

Accordingly, the inventors herein have recognized a need for a battery module having a cooling manifold that eliminates and/or reduces the above mentioned deficiency

SUMMARY OF THE INVENTION

A battery module in accordance with an exemplary embodiment is provided. The battery module includes a plurality of battery cell assemblies having a plurality of heat exchangers. The battery module further includes a first cooling manifold operably coupled to the plurality of battery cell assemblies. The first cooling manifold has a manifold portion and a cover plate. The manifold portion has a peripheral wall, a rear wall coupled to the peripheral wall, and a flow diverter. The peripheral wall has a top portion with an inlet aperture extending therethrough. The rear wall has a plurality of outlet apertures extending therethrough. The cover plate is coupled to the peripheral wall opposite to the rear wall. The flow diverter extends from the rear wall and is disposed below the inlet aperture. The flow diverter is configured to receive fluid from the inlet aperture and to divert the fluid so that a substantially equal flow rate of the fluid is obtained through each outlet aperture of the plurality of outlet apertures to a respective heat exchanger of the plurality of heat exchanger for cooling the plurality of battery cell assemblies.

A method for cooling a battery module in accordance with another exemplary embodiment is provided. The battery module has a plurality of battery cell assemblies and a first cooling manifold. The plurality of battery cell assemblies have a plurality of heat exchangers. The method includes routing fluid into the first cooling manifold. The method further includes diverting the fluid within the first cooling manifold utilizing a flow diverter such that a substantially equal flow rate of the fluid is obtained through each outlet aperture of a plurality of outlet apertures extending through the first cooling manifold. The method further includes routing the fluid from each outlet aperture into a respective heat exchanger of the plurality of heat exchangers for cooling the plurality of battery cell assemblies.

A cooling manifold for a battery module in accordance with another exemplary embodiment is provided. The battery module has a plurality of battery cell assemblies. The cooling manifold includes a manifold portion having a peripheral wall, a rear wall coupled to the peripheral wall, and a flow diverter. The peripheral wall has a top portion with an inlet aperture extending therethrough. The rear wall has a plurality of outlet apertures extending therethrough. The flow diverter extends from the rear wall and is disposed below the inlet aperture. The flow diverter he is configured to receive fluid from the inlet aperture and to divert the fluid so that a substantially equal flow rate of the fluid is obtained through each outlet aperture of the plurality of outlet apertures to a respective battery cell assembly of the plurality of battery cell assemblies. The cooling manifold further includes a cover plate coupled to the peripheral wall of the manifold portion opposite to the rear wall.

BRIEF DESCRIPTION OF THE DRAWINGS

FIG. 3 is an exploded schematic of a battery cell assembly utilized in the battery module of FIG. 2;

FIG. 6 is a schematic of a manifold portion of the cooling manifold of FIG. 5; and FIG. 7 is another schematic of the manifold portion of the cooling manifold of FIG. 5.

DETAILED DESCRIPTION OF AN EXEMPLARY EMBODIMENT

Figure 1:
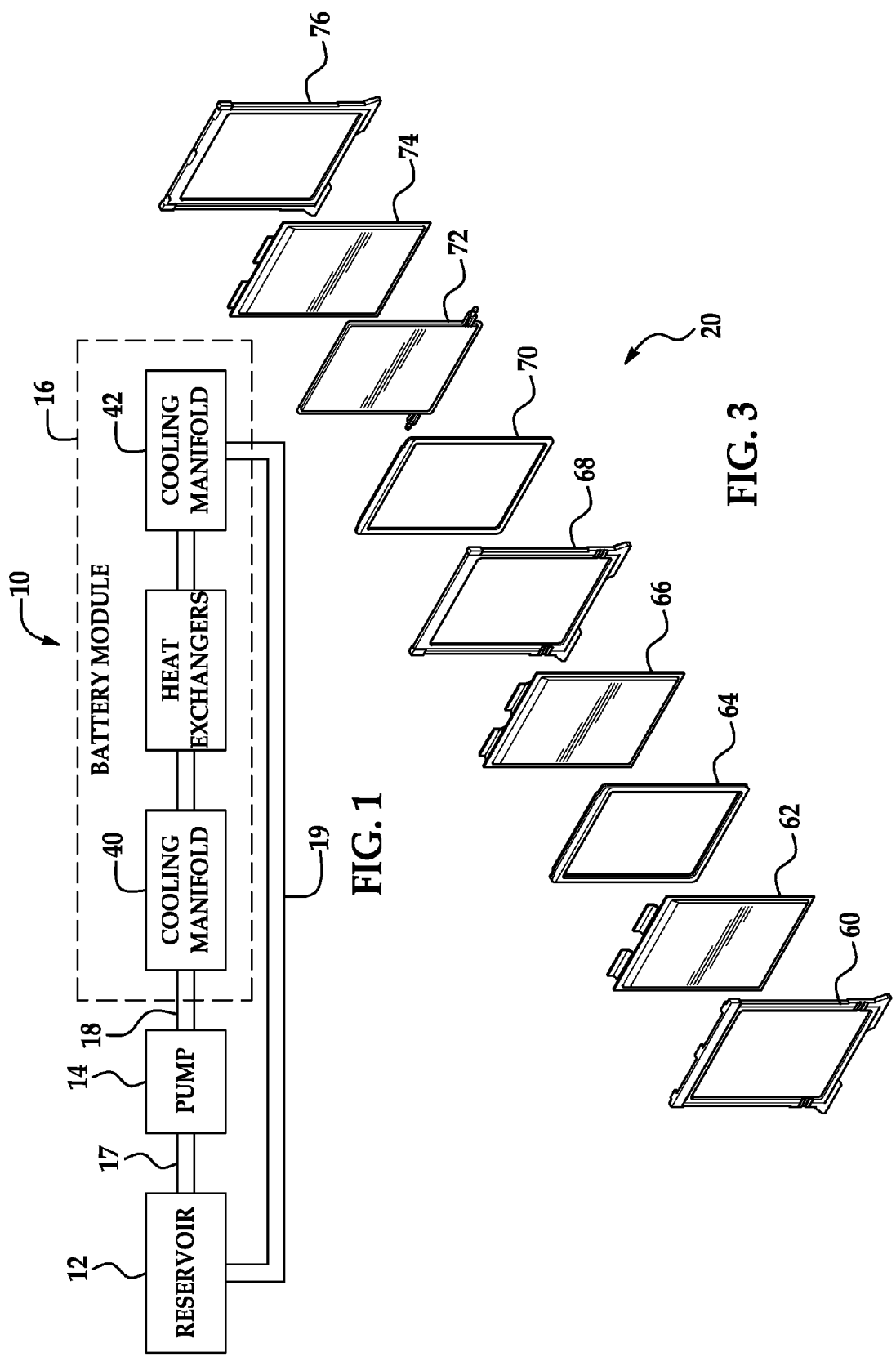
FIG. 1 is a schematic of a system for cooling a battery module in accordance with an exemplary embodiment.

Referring to FIG. 1, a system 10 for cooling a battery module 16 is illustrated. The system 10 includes a reservoir 12, a pump 14, and conduits 17, 18 and 19. The reservoir 12 holds a fluid therein. The pump 14 pumps the fluid from the reservoir 12 via the conduit 17. Thereafter, the pump 14 pumps the fluid into the battery module 16 via the conduit 18. The battery module 16 includes a cooling manifold 40, heat exchangers, and a cooling manifold 42 that will be explained in greater detail below. The cooling manifold 40 is configured to provide a substantially equal flow rate of the fluid through each of the respective heat exchangers in the battery module 16 such that the battery cells therein have a substantially equal amount of heat energy removed from the battery cells. Thus, all of the battery cells in the battery module 16 are maintained at a substantially similar temperature resulting in the battery cells having uniform operational characteristics including output voltages. The cooling manifold 42 receives the heated fluid from the heat exchangers in the battery module 16 and routes the heated fluid through the conduit 19 back to the reservoir 12. A battery cell assembly is defined as a housing having a battery cell therein. A battery module is defined as at least two battery cell assemblies physically or electrically coupled together.

Figure 2:
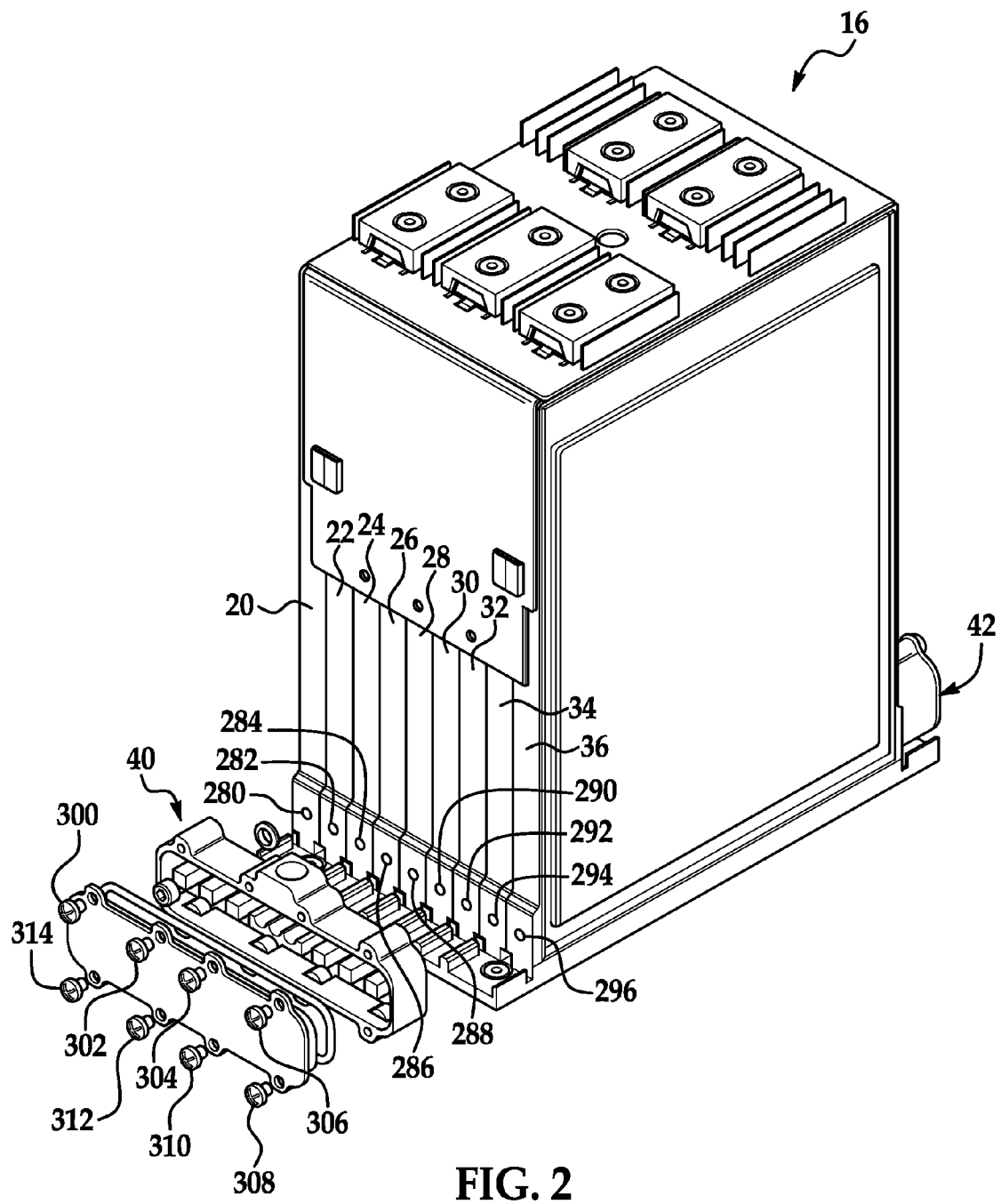
FIG. 2 is a schematic of a battery module in accordance with another exemplary embodiment.

Referring to FIG. 2, the battery module 16 includes battery cell assemblies 20, 22, 24, 26, 28, 30, 32, 34 and 36 and cooling manifolds 40 and 42. Because the battery cell assemblies 20, 22, 24, 26, 28, 30, 32, 34 and 36 have a substantially similar configuration, only the battery cell assembly 20 will be described in greater detail below. Referring to FIG. 3, the battery cell assembly 20 includes a frame member 60, a battery cell 62, a securement member 64, a battery cell 66, a frame member 68, a securement member 70, a heat exchanger 72, a battery cell 74, and a frame member 76. The frame members 60 and 68 are provided to support the battery cell 62, the securement member 64, and the battery cell 66 therebetween. The frame members 68 and 76 are provided to support the securement member 70, the heat exchanger 72, and the battery cell 74 therebetween. In one exemplary embodiment, the battery cells 62, 66, 74 are lithium-ion battery cells. During operation, the cooling manifold provides a predetermined flow rate of fluid through the heat exchanger 72 such that heat energy is removed from the battery cells 62, 66 and 74 that are thermally coupled to the heat exchanger 72 such that the battery cells 62, 66 and 74 are maintained at a substantially similar temperature.

Figure 4:
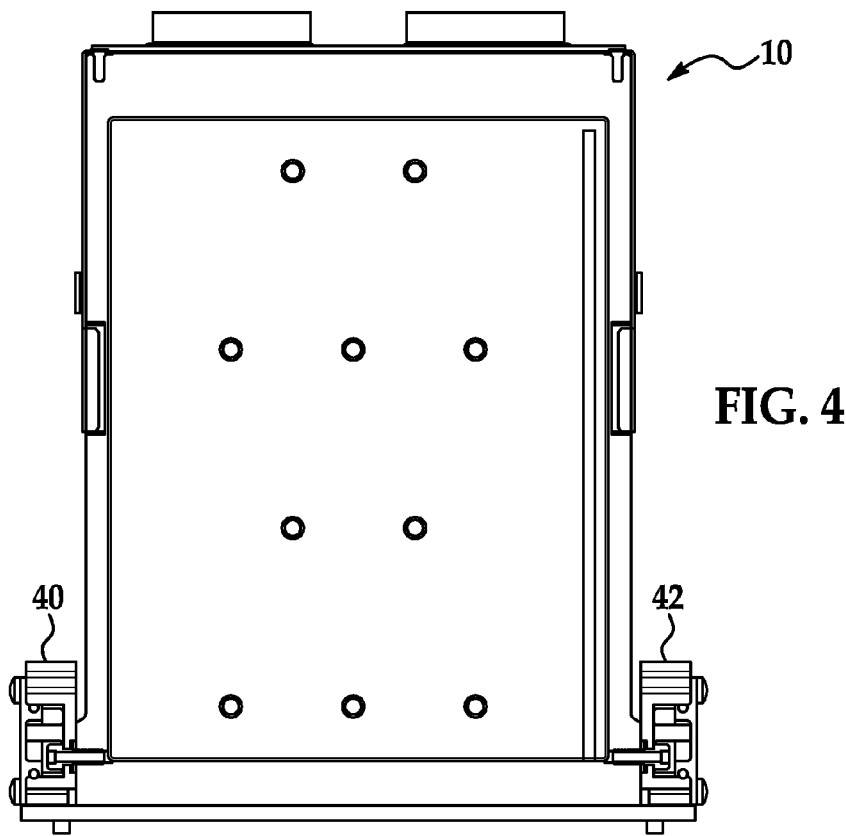
FIG. 4 is a sectional schematic of the battery module of FIG. 2.
Figure 5:
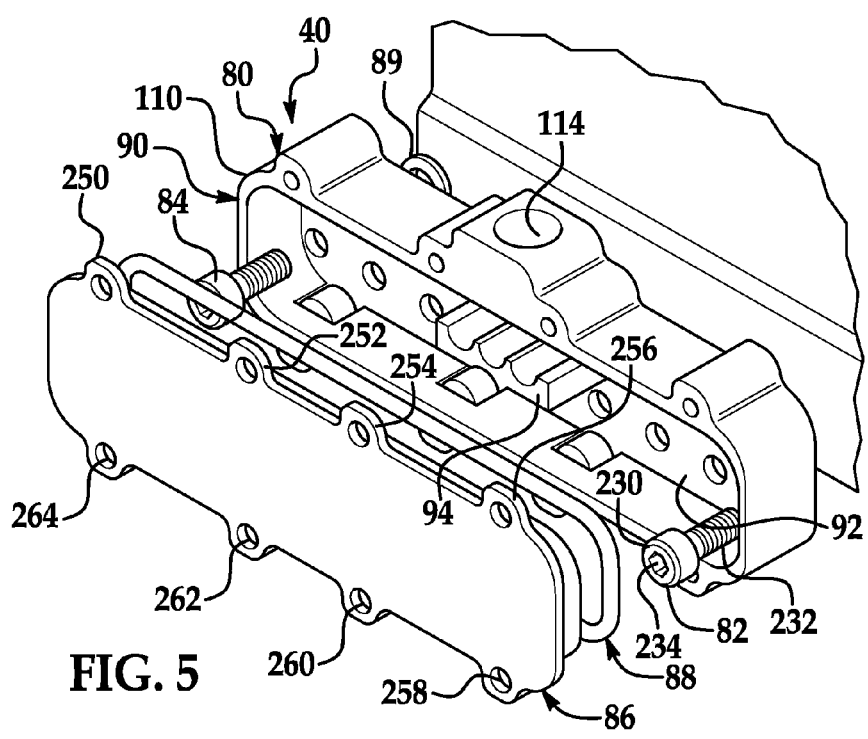
FIG. 5 is an exploded schematic of a cooling manifold utilized in the battery module of FIG. 2.

Referring to FIGS. 4 and 5, a structure of the cooling manifold 40 will now be explained. The cooling manifold 40 includes a manifold portion 80, a plurality of vented screws such as vented screws 82, 84, a cover plate 86, a gasket 88, and a plurality of o-rings such as o-ring 89.

The manifold portion 80 includes a peripheral wall 90, a rear wall 92 coupled to the peripheral wall 90, and a flow diverter 94 coupled to the rear wall 92. In one exemplary embodiment, the manifold portion 80 is constructed from plastic. Of course, in alternative embodiments, the manifold portion 80 could be constructed from other materials such as steel, ceramics, or metal alloys for example. The peripheral wall 90 includes a front end 110 and a rear end 112. Further, the peripheral wall 90 has a top portion with an aperture 114 extending therethrough. The aperture 114 receives fluid from the pump 14 (shown in FIG. 1). Still further, the peripheral wall 90 includes a plurality of threaded apertures 150, 152, 154, 156, 158, 160, 162, 164 extending into the front end 110 of the peripheral wall 90 for receiving mounting screws therein for coupling the cover plate 86 to the manifold portion 80.

Referring to FIGS. 6 and 7, the rear wall 92 includes outlet apertures 180, 182, 184, 186, 188, 190, 192, 194 and 196 extending therethrough for receiving vented screws therethrough. The vented screws route fluid from an interior region of the cooling manifold 40 to the battery cell assemblies 20, 22, 24, 26, 28, 30, 32, 34 and 36, respectively. It should be noted that although only vented screws 82, 84 are shown, each of the apertures 180, 182, 184, 186, 188, 190, 192, 194 and 196, would have a corresponding vented screw extending therethrough. Referring to FIGS. 2, 6 and 7, the vented screws extend through the apertures 180, 182, 184, 186, 188, 190, 192, 194 and 196 are received in the apertures 280, 282, 284, 286, 288, 290, 292, 294, 296, respectively in the battery cell assemblies 20, 22, 24, 26, 28, 30, 32, 34, 36, respectively. The apertures 280, 282, 284, 286, 288, 290, 292, 294, 296 fluidly communicate with respective heat exchangers in the battery module 16. Because the vented screws have a substantially similar structure, only the structure of the vented screw 82 will be described. In particular, referring to FIG. 5, the vented screw 82 includes a head portion 230, a threaded portion 232, and an aperture 234 extending through both the headed portion 230 and the threaded portion 232. Thus, the vented screws allow fluid communication between an interior region of the cooling manifold 40 and the heat exchangers in the battery module 16.

Referring to FIG. 6, the flow diverter 94 is coupled to the rear wall 92 and extends from the rear wall 92 toward the front end 110 of the peripheral wall 90. The flow diverter 94 is disposed below the inlet aperture 114. The flow diverter 94 is configured to receive fluid from the inlet aperture 114 and to divert the fluid so that a substantially equal flow rate of the fluid is obtained through the outlet apertures 180, 182, 184, 186, 188, 190, 192, 194 and 196 to respective heat exchangers in the battery cell assemblies 20, 22, 24, 26, 28, 30, 32, 34 and 36, respectively, for uniformly cooling the battery cell assemblies. In one exemplary embodiment, the flow diverter 94 comprises a plate 210 with grooves 212, 214, 216 on a top surface thereof that are spaced apart from one another. The grooves 212, 214, 216 extend from an end of the plate 210 proximate to the rear wall 92 toward the cover plate 86. Further, in one exemplary embodiment, the flow diverter 94 is configured such that the flow rate of fluid that is obtained through each outlet aperture is within ±5% of a first flow rate.

Referring to FIG. 5, the cover plate 86 is coupled to the front end 110 of the peripheral wall 90. In one exemplary embodiment, the cover plate 86 is constructed from plastic. Of course, in alternative embodiments, the cover plate 86 could be constructed from other materials such as steel, ceramics, or metal alloys for example. In an exemplary embodiment, the cover plate 86 includes apertures 250, 252, 254, 256, 258, 260, 262, 264 extending therethrough. Bolts 300, 302, 304, 306, 308, 310, 312 and 314 extend through the apertures 250, 252, 254, 256, 258, 260, 262 and 264, respectively, of the cover plate 88 and the apertures 150, 152, 154, 156, 158, 160, 162 and 164, respectively of the manifold portion 80 to couple the cover plate 88 to the manifold portion 80.

Referring to FIGS. 1 and 2, the cooling manifold 42 has a substantially similar structure as the cooling manifold 40. The cooling manifold 42 receives the heated fluid from the heat exchangers in the battery cell assemblies of the battery module 16 and returns the heated fluid to the reservoir 12, via the conduit 19.

The battery module 10 has a cooling manifold that provides a substantial advantage over other battery modules. In particular, the battery module has a cooling manifold that provides a technical effect of diverting fluid such that a substantially equal flow rate of fluid is obtained through heat exchangers in the battery module to maintain battery cells within the battery module at a substantially uniform temperature.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed for carrying this invention, but that the invention will include all embodiments falling within the scope of the appended claims. Moreover, the use of the terms, first, second, etc. are used to distinguish one element from another. Further, the use of the terms a, an, etc. do not denote a limitation of quantity, but rather denote the presence of at least one of the referenced items.

We claim:

1. A battery module, comprising:
a plurality of battery cell assemblies having a plurality of heat exchangers; and
a first cooling manifold operably coupled to the plurality of battery cell assemblies, the first cooling manifold having a manifold portion and a cover plate, the manifold portion having a peripheral wall, a rear wall coupled to the peripheral wall, and a flow diverter, the peripheral wall having a top portion with an inlet aperture extending therethrough, the rear wall having a plurality of outlet apertures extending therethrough, the cover plate coupled to the peripheral wall opposite to the rear wall, the flow diverter having a first plate extending from the rear wall and being disposed directly below the inlet aperture, the first plate having a plurality of grooves thereon that are spaced apart from one another and extend from an end portion of the first plate proximate to the rear wall toward the cover plate, such that the flow diverter receives fluid from the inlet aperture and diverts the fluid so that a substantially equal flow rate of the fluid is obtained through each outlet aperture of the plurality of outlet apertures to a respective heat exchanger of the plurality of heat exchanger for cooling the plurality of battery cell assemblies, the flow diverter being disposed vertically below the inlet aperture and vertically above the plurality of outlet apertures, the flow diverter being further disposed perpendicular to a direction of the fluid flowing through the inlet aperture.

2. The battery module of claim 1, wherein both the manifold portion and the cover plate are constructed of plastic.

3. The battery module of claim 1, further comprising a second cooling manifold configured to receive the fluid from the plurality of heat exchangers.

4. The battery module of claim 1, wherein the flow rate of the fluid through each outlet aperture is within ±5% of a first flow rate.

5. The battery module of claim 1, wherein each battery cell assembly has a battery cell.

6. The cooling manifold of claim 1, wherein the plurality of grooves extend from a top surface of the first plate into the first plate, each groove of the plurality of grooves having an identical arcuate-shaped cross-sectional profile.

7. A method for cooling a battery module, the battery module having a plurality of battery cell assemblies and a first cooling manifold, the plurality of battery cell assemblies having a plurality of heat exchangers, the method comprising:
    routing fluid into the first cooling manifold through an inlet aperture of the first cooling manifold;
    diverting the fluid within the first cooling manifold utilizing a flow diverter, the flow diverter having a first plate disposed directly below the inlet aperture, the first plate having a plurality of grooves thereon that are spaced apart from one another and extend in a first direction such that a substantially equal flow rate of the fluid is obtained through each outlet aperture of a plurality of outlet apertures extending through the first cooling manifold, the flow diverter being disposed vertically below the inlet aperture and vertically above the plurality of outlet apertures, the flow diverter being further disposed perpendicular to a direction of the fluid flowing through the inlet aperture; and
    routing the fluid from each outlet aperture into a respective heat exchanger of the plurality of heat exchangers for cooling the plurality of battery cell assemblies.

8. The method of claim 7, wherein the flow rate of the fluid through each outlet aperture is within ±5% of a first flow rate.

9. The method of claim 7, wherein the plurality of grooves extend from a top surface of the first plate into the first plate, each groove of the plurality of grooves having an identical arcuate-shaped cross-sectional profile.

10. A cooling manifold for a battery module, the battery module having a plurality of battery cell assemblies, comprising:
    a manifold portion having a peripheral wall, a rear wall coupled to the peripheral wall, and a flow diverter, the peripheral wall having a top portion with an inlet aperture extending therethrough, the rear wall having a plurality of outlet apertures extending therethrough, the flow diverter having a first plate disposed directly below the inlet aperture, the flow diverter configured to receive fluid from the inlet aperture and to divert the fluid so that a substantially equal flow rate is obtained through each outlet aperture of the plurality of outlet apertures to a respective battery cell assembly of the plurality of battery cell assemblies, the flow diverter being disposed vertically below the inlet aperture and vertically above the plurality of outlet apertures, the flow diverter being further disposed perpendicular to a direction of the fluid flowing through the inlet aperture; and
    a cover plate coupled to the peripheral wall of the manifold portion opposite the rear wall.

11. The cooling manifold of claim 10, wherein the first plate has a plurality of grooves thereon that are spaced apart from one another, the plurality of grooves extending from an end of the first plate proximate to the rear wall toward the cover plate, the plurality of grooves extending from a top surface of the first plate into the first plate, each groove of the plurality of grooves having an identical arcuate-shaped cross-sectional profile.

12. The cooling manifold of claim 10, wherein both the manifold portion and the cover plate are constructed of plastic.

13. The cooling manifold of claim 10, wherein the flow rate of the fluid through each outlet aperture is within ±5% of a first flow rate.

* * * * *